United States Patent [19]

Mishida et al.

[11] Patent Number: 5,139,631
[45] Date of Patent: Aug. 18, 1992

[54] CATIONIC ELECTRODEPOSITION COATING RESIN COMPOSITION BASED ON 4-VINYLCYCLOHEXENE-1-OXIDE COPOLYMERS

[75] Inventors: Reiziro Mishida; Akira Tominaga, both of Hiratsuka, Japan

[73] Assignee: Kansai Paint Co., Ltd., Kanagawa, Japan

[21] Appl. No.: 807,025

[22] Filed: Dec. 9, 1991

Related U.S. Application Data

[62] Division of Ser. No. 599,358, Oct. 18, 1990, Pat. No. 5,091,446.

[30] Foreign Application Priority Data

Oct. 19, 1989 [JP] Japan ................... 1-271957

[51] Int. Cl.$^5$ ............... C08G 59/02; C07D 303/12; C25D 13/00; C08L 63/00
[52] U.S. Cl. ................. 204/181.7; 523/404; 523/414; 523/415; 525/404; 525/109; 525/117; 525/526; 528/393
[58] Field of Search ................. 204/181.7; 523/404, 523/414, 415; 525/404, 117; 528/393

[56] References Cited

U.S. PATENT DOCUMENTS 4,565,859  1/1986  Murai et al. ............ 528/365
4,841,017  1/1989  Murai et al. ............ 528/393

Primary Examiner—John C. Bleutge
Assistant Examiner—Frederick Krass
Attorney, Agent, or Firm—Wenderoth, Lind & Ponack

[57] ABSTRACT

A cationic electrodeposition coating resin composition composed mainly of
(A) a resin containing a primary hydroxyl group and a cationic group, and
(B) an epoxy resin which is a copolymer comprising recurring units represented by formula (I)

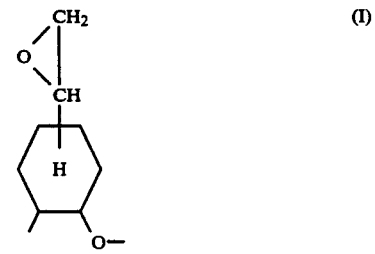

and recurring units represented by formula (II)

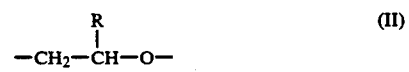

wherein R denotes a $C_3$–$C_{35}$ alkyl group, the proportion of the recurring units of formula being 1 to 75% by weight.

1 Claim, No Drawings

CATIONIC ELECTRODEPOSITION COATING RESIN COMPOSITION BASED ON 4-VINYL-CYCLOHEXENE-1-OXIDE COPOLYMERS

This application is a division of application Ser. No. 07/599,358, filed Oct. 18, 1990 now U.S. Pat. No. 5,091,446.

This invention relates to a cationic electrodeposition coating composition obtained without the use of a blocked isocyanate as a curing agent or an organotin compound as a curing catalyst and being excellent in stability and curability as well as in properties of a coated film such as adhesion, weatherability and low-temperature curability.

Cationic electrodeposition coating resin compositions composed mainly of polyamine resins such as amine addition epoxy resins and aromatic polyisocyanate compounds (curing agents) blocked by alcohols have been most widely used so far. They however suffer serious defects that a temperature at which to start curing is high (above 170° C.); if an organotin compound is used as a curing catalyst to decrease the temperature at which to start curing, it poisons at times an exhaust combustion catalyst of a baking oven; when the coated film is heated at a high temperature for curing, the blocked polyisocyanate is heat-decomposed to form tar and soot, the top coated film causes yellowing, bleeding, curing hindrance, etc. and weatherability of the top coated film is notably decreased and liable to whiten; and corrosion resistance of the coated film is not enough. Improvement thereof has therefore been strongly demanded.

Electrodeposition coating resins utilizing self-crosslinking curability by a ring-opening reaction of an epoxy group without the conjoint use of a curing agent are known and proposed in e.g. British Patent Nos. 1,306,101, 1,327,071 and 1,411,249 and U.S. Pat. No. 3,839,252. However, these electrodeposition coating resins are poor in bath stability of the electrodeposition coating and curability of the coated film at the same time. For instance, a glycidyl ether-type polyepoxy compound which is the most common among them is excellent in curability but poor in bath stability and corrosion resistance.

The present inventors have made extensive studies to find a cationic electrodeposition coating resin composition that has eliminated the aforesaid problems, and consequently discovered that a cationic lectrodeposition coated film excellent in low-temperature curability and corrosion resistance can be formed by using as a cationic electrodeposition coating resin composition a resin composition composed mainly of a resin containing a primary hydroxyl group and a cationic group and an epoxy resin having a specific structure. This discovery has led to completion of this invention.

Thus, according to this invention, there is provided a cationic electrodeposition coating resin composition composed mainly of (A) a resin containing a primary hydroxyl group and a cationic group, and (B) an epoxy resin which is a copolymer comprising recurring units represented by formula (I)

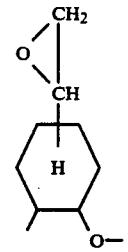

and recurring units represented by formula (II)

wherein R denotes a $C_3$–$C_{35}$ alkyl group, the proportion of the recurring units of formula (II) being 1 to 75% by weight.

The electrodeposition coated film formed by using the cationic electrodeposition coating resin composition of this invention can be cured at a temperature of about 250° C. or lower. Especially when the resin composition of this invention is blended with one or more of compounds containing metals such as lead, zirconium, cobalt, aluminum, manganese, copper, zinc, iron, chromium and nickel, it is possible to form an electrodeposition coated film that can be cured by heating at a low temperature of about 70° C. to about 160° C.

Though the curing mechanism of the electrodeposition coated film is not exactly known, it is presumed that the epoxy group contained in the epoxy resin (B) is ring-opened and reacted with the primary hydroxyl group of the resin (A), and the epoxy groups of the resin (B) are reacted with each other to form ether linkages respectively and allow curing by crosslinking.

Accordingly, the cationic electrodeposition coating resin composition of this invention have various excellent advantages that it can be cured at a low temperature of 160° C. or below without the use of a tin catalyst; because the blocked isocyanate compound or its derivative is not used, the above defects provided by the use thereof can be eliminated; good adhesion is shown without volume shrinkage owing to heat decomposition; as an aromatic urethane bond or an aromatic urea bond is not introduced in crosslink, weatherability is less impaired; corrosion resistance and curability of the electrodeposition coated film are excellent; and stability of an electrodeposition bath is good.

The cationic electrodeposition coating resin composition of this invention will be described in more detail.

Resin (A)

The resin (A) (hereinafter referred to as a "substrate resin (A)") containing the primary hydroxyl group and the cationic group, which is used in the resin composition of this invention, includes an optional resin containing a primary hydroxyl group capable of reacting with an epoxy group in the epoxy resin (B) which will be later described and a cationic group in an enough amount to form a stable aqueous dispersion. Examples of the substrate resin (A) that can be used in the composition of this invention are as follows.

(i) a reaction product obtained by reacting a polyepoxide compound with cationizing agent;

(ii) a product formed by protonating with an acid a polycondensate of a polycarboxylic acid and a polyamine (refer to U.S. Pat. No. 2,450,940);

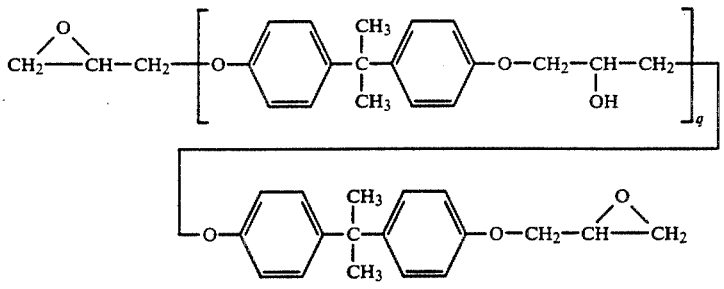

(q: 0-7)

(iii) a product formed by protonating with an acid a polyaddition product of a polyisocyanate and a polyol with a monoamine or a polyamine;
(iv) a product formed by protonating with an acid a copolymer obtained from an acrylic or vinyl monomer containing a hydroxyl group and an amino group (refer to U.S. Pat. Nos. 3,455,806 and 3,454,482); and
(v) a product formed by protonating with an acid an adduct of a polycarboxylic acid resin with an alkyleneimine (U.S. Pat. No. 3,403,088).

Concrete examples of these cationic resins and processes for producing same are described in British Patent No. 1,327,071 and U.S. Pat. Nos. 3,455,806, 3,454,482, 2,450,940, 3,403,088, 3,891,529 and 3,963,663.

Most preferable as the substrate resin (A) in this invention is the reaction product of the polyepoxide compound and the cationizing agent shown in (i) above, especially a product obtained by reacting an epoxy group of a polyepoxide compound formed from a polyphenol compound and an epihalohydrin such as epichlorohydrin and having excellent corrosion resistance with a cationizing agent.

Suitable as the polyepoxide compound is a compound containing at least two epoxy groups of formula

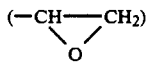

in a molecule, and having a number-average molecular weight of usually at least 200, preferably 400 to 4,000, more preferably 800 to 2,000 and an epoxy equivalent of usually at least 100, preferably 200 to 2,000, more preferably 400 to 1,000. As the polyepoxide compound, a compound known per se is available including, for example, a polyglycidyl ether of a polyphenol compound which can be formed by reacting the polyphenol compound with epichlorohydrin in the presence of an alkali. Examples of the polyphenol compound include bis(4-hydroxyphenyl)-2,2-propane, 4,4'-dihydroxybenzophenone, bis(4-hydroxyphenyl)-1,1-ethane, bis-(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenylether, 4,4'-dihydroxydiphenylsulfone, phenolic novolak and cresol novolak.

Among the above polyepoxide compounds, a polyglycidyl ether of a polyphenol compound represented by the following formula, which has a number-average molecular weight of about 380 to about 4,000, more preferably about 800 to about 2,000 and an epoxy equivalent of 190 to 2,000, preferably 400 to 1,000 is especially suitable in producing the substrate resin (A).

The polyepoxide compound may be partially reacted with a polyol, a polyether polyol, a polyester polyol, a polyamideamine, a polycarboxylic acid or a polyisocyanate, and may further graft-polymerized with epsiloncaprolactone or an acrylic monomer.

On the other hand, examples of the cationizing agent for introducing the cationic group into the polyepoxide compound are aliphatic, alicyclic or aromatic-aliphatic primary or secondary amines, tertiary amine salts, secondary sulfide salts and tertiary phosphine salts. They are reacted with the epoxy group to form the cationic group. It is also possible that a tertiary aminomonoisocyanate obtained by the reaction of the tertiary aminoalcohol with the diisocyanate is reacted with the hydroxyl group of the epoxy resin to form the cationic group. Thus, an amine compound having active hydrogen is especially suitable as the cationizing agent.

Examples of the amine compound as the cationizing agent are as follows.
(1) primary amines such as methylamine, ethylamine, n- or iso-propylamine, monoethanolamine, and n- or iso-propanolamine
(2) secondary amines such as diethylamine, diethanolamine, di-n- or di-iso-propanol amine, N-methylethanolamine, and N-ethylethanolamine
(3) polyamines such as ethylenediamine, diethylenetriamine, hydroxyethylaminoethylamine, ethylaminoethylamine, methylaminopropylamine, dimethylaminoethylamine, and dimethylaminopropylamine Of these, the alkanolamines having the hydroxyl group are preferable. Moreover, the primary amino group may be previously reacted with a ketone for blocking, and then the remaining active hydrogen be reacted with the epoxy group.

Besides the above amine compounds, basic compounds such as ammonia, hydroxylamine, hydrazine, hydroxyethylhydrazine and N-hydroxyethylimidazoline are also available.

The basic group formed by using these compounds can be converted into the cationic group by protonation with an acid, most preferably a water-soluble organic carboxylic acid such as formic acid, acetic acid, glycolic acid or lactic acid.

Also available as the cationizing agent are tertiary amines such as triethylamine, triethanolamine, N,N-dimethylethanolamine, N-methyldiethanolamine, N,N-diethylethanolamine, and N-ethyldiethanolamine. It is possible that they are previously protonated with an acid and then reacted with an epoxy group to form a quaternary base.

Besides the amino compounds, tertiary sulfonium salts obtained by reacting with the epoxy group salts of sulfides such as diethyl sulfide, diphenyl sulfide, tetramethylene sulfide and thiodiethanol sulfide and boric acid, carbonic acid and organic monocarboxylic acid are also available as the cationizing agent.

It is moreover possible that salts of phosphines such as triethylphosphine, phenyldimethylphosphine, diphenylmethylphosphine and triphenylphosphine and the above acids are used as the cationizing agent and reacted with the epoxy group to introduce the quaternary phosphonium base into the polyepoxide compounds.

The hydroxyl group of the substrate resin (A) used in this invention can be a primary hydroxyl group introduced by a reaction of the substrate resin (A) with an alkanolamine of the cationizing group, a ring-opened substance of caprolactone that may be introduced into the polyepoxide compound or a polyol. Of these, the primary hydroxyl group introduced by using the alkanolamine is desirable because of excellent cuarability by crosslinking with the epoxy resin (B). As the alkanolamine, those exemplified as the cationizing agent are preferable.

The amount of the primary hydroxyl group in the substrate resin (A) is, from the aspect of curability by crosslinking with the epoxy resin (B), usually 200 to 1,000 hydroxyl equivalents, preferably 250 to 900 hydroxyl equivalents, more preferably 300 to 800 hydroxyl equivalents. The amount of the cationic group can be an amount which is at least a minimal amount necessary to stably disperse the substrate resin (A) in an aqueous medium. It is usually 3 to 200, preferably 5 to 100, most preferably 10 to 80, calculated as KOH (mg/g solids content) (amine value). Even if the content of the cationic group is less than 3, it is possible to form an aqueous dispersion using a surface active agent. On this occasion, it is desirous to adjust the cationic group such that pH of the composition of the aqueous dispersion is usually 4 to 9, more preferably 6 to 7.

It is advisable that the substrate resin (A) used in this invention has the primary hydroxyl group and the cationic group and is in principle free from a free epoxy group.

Epoxy resin (B)

The epoxy resin (B) as a curing agent used by mixing it with the substrate resin (A) (hereinafter referred to at times as a "curing resin (B)") is a resin which is a copolymer comprising recurring units represented by formula (I)

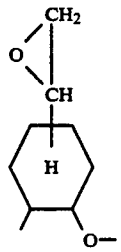

and recurring units represented by formula (II)

wherein R denotes a $C_3$–$C_{35}$ alkyl group, the proportion of the recurring units of formula (II) being 1 to 75% by weight, preferably 2 to 50% by weight, more preferably 5 to 30% by weight.

The $C_3$–$C_{35}$ alkyl group represented by R in formula (II) may be either linear or branched. Examples thereof are n-pentyl, isopentyl, tert-pentyl, neopentyl, n-hexyl, isohexyl, 1-methylpentyl, n-heptyl, n-octyl, n-nonyl, n-decyl, dodecyl and tridecyl. A $C_7$–$C_{20}$ alkyl group is most preferable.

The curing resin (B) can have a residue X of a polymerization initiator component in one end as shown by the following formulas (III) and (IV).

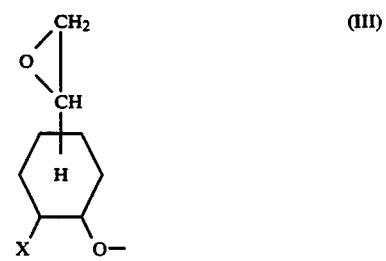

wherein X denotes a residue of an organic compound having active hydrogen.

Examples of the organic compound having active hydrogen as the precursor are alcohols, phenols, carboxylic acids, amines and thiols. Of these, the alcohols may be either monohydric alcohols or polyhydric alcohols. Examples thereof are aliphatic monohydric alcohols such as methanol, ethanol, propanol, butanol, pentanol, hexanol and octanol; aromatic monohydric alcohols such as benzyl alcohol; and polyhydric alcohols such as ethylene glycol, diethylene glycol, triethylene glycol, polyethylene glycol, propylene glycol, dipropylene glycol, 1,3-butanediol, 1,4-butanediol, pentanediol, 1,6-hexanediol, neopentyl glycol, hydroxypivalic acid neopentyl glycol ester, cyclohexane dimethanol, glycerol, diglycerol, polyglycerol, trimethylolpropane, trimethylolethane, pentaerythritol, and dipentaerythritol.

Examples of the phenols are phenol, cresol, catechol, pyrogallol, hydroquinone, hydroquinone monomethyl ether, bisphenol A, bisphenol F, 4,4'-dihydroxybenzophenone, bisphenol S, a phenol resin, and a cresol novolak resin.

Examples of the carboxylic acids are formic acid, acetic acid, propionic acid, butyric acid, fatty acids of animal and vegetable oils, fumaric acid, maleic acid, adipic acid, dodecandioic acid, trimellitic acid, pyromellitic acid, polyacrylic acid, phthalic acid, isophthalic acid, and terephthalic acid. Compounds having both a hydroxyl group and a carboxyl group, such as lactic acid, citric acid, and hydroxycaproic acid are also available.

Moreover, as the organic compound having active hydrogen, polyvinyl alcohol, a partial hydrolysate of polyvinyl acetate, starch, cellulose, cellulose acetate, cellulose acetate butyrate, hydroxyethyl cellulose, an allyl polyol resin, a styrene-allyl alcohol copolymer, a styrene-maleic acid copolymer, an alkyd resin, a polyester polyol resin, and a polycaprolactone polyol resin are also available. The compound having active hydrogen may have also an unsaturated double bond in the skeleton like allyl alcohol and vinyl alcohol, or may have a structure that the unsaturated double bond is epoxidized.

Another end of the curing resin (B) can be represented by the following formula (V) or (VI).

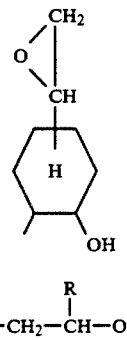

The amount of the polymerization intiator component is usually not more than 50% by weight, preferably not more than 25% by weight, more preferably not more than 20% by weight. As the amount of the intiator component is smaller, the proportions of the main components shown by formulas (I) and (II) are higher; this is desirous.

The weight-average molecular weight of the curing resin (B) is usually about 300 to 100,000, preferably about 700 to 50,000, more preferably 700 to 30,000.

The epoxy equivalent of the curing resin (B) is usually about 100 to 2,000, preferably 150 to 500, and more preferably 150 to 250.

The curing resin (B) can be produced by epoxidizing in a usual manner with an oxidizing agent such as a peracid or a hydroperoxide a polyether resin (ring-opened copolymer) obtained by ring-opening copolymerizing vinylcyclohexene-1-oxide represented by formula (VII),

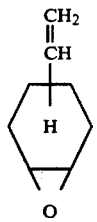

for example, 4-vinylcyclohexene-1-oxide with an epoxidized product of an alpha-olefin represented by formula (VIII)

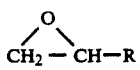

wherein R is as defined above, using the above organic compound having active hydrogen as an initiator.

4-Vinylcyclohexene-1-oxide can be obtained by, for example, epoxidizing part or the whole of double bonds of the cyclohexene portion in vinyl cyclohexene resulting from the dimerization reaction of butadiene with peracetic acid.

The epoxidized product of the alpha-olefin represented by formula (VIII) is a product formed by epoxidizing an alpha-olefin compound ($CH_2$=CH—R) with a peracid, preferably, an organic peracid such as perbenzoic acid or permonophthalic acid. Examples of the alpha-olefin compound include 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-dodecene, 1-heptacosene, 1-triacontene, 1-hentriacontene, 1-pentatriacontene, 3-methyl-1-butene, 3-methyl-1-pentene, 4-methyl-1-pentene, 3,3-dimethyl-1-butene, and 4,4-dimethyl-1-pentene. Moreover, examples of the epoxidized product of the alpha-olefin include 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytridecane, 1,2-epoxypentadecane, 1,2-epoxyhexadecane, 1,2-epoxyheptadecane, 1,2-epoxyoctadecane, 1,2-epoxynonadecane, 1,2-epoxyeicosane, 1,2-epoxyheneicosane, 1,2-epoxydocosane, 1,2-epoxyheptacosane, and 1,2-epoxytriacontane. Further, AOEX 24, AOEX 68, AOYO 8 (tradenames for products of Daisel Kagaku Kogyo K.K.) are also available. They can be used either singly or in combination.

It is advisable that the ring-opening polymerization of vinylcyclohexene-1-oxide of formula (VII) with the epoxidized product of the alpha-olefin of formula (VIII) in the presence of the active hydrogen-containing compound is carried out using a catalyst. Examples of the catalyst include organic bases such as amines, e.g. methylamine, ethylamine, propylamine and piperazine, pyridines, and imidazoles; organic acids such as formic acid, acetic acid and propionic acid; inorganic acids such as sulfuric acid and hydrochloric acid; alkali metal alcoholates such as sodium methylate; alkalis such as KOH and NaOH; Lewis acids such as $BF_3$, $ZnCl_2$, $AlCl_3$ and $SnCl_4$ or their complexes; and organic metal compounds such as triethyl aluminum and diethyl zinc.

The amount of the catalyst is 0.001 to 10% by weight, preferably 0.1 to 5% by weight based on the reaction product. The temperature of the ring-opening polymerization reaction is usually −70° to 200° C., preferably −30° C. to 100° C. The reaction can be carried out using a solvent. An ordinary solvent free from active hydrogen is desirous as the solvent.

If the vinyl group side chain in the thus formed ring-opened copolymer of cyclohexene oxide having the vinyl group side chain and the epoxidized product of the alpha-olefin is epoxidized, the curing resin (B) can be produced. The epoxidation can be carried out using a peracid or a hydroperoxide. Examples of the peracid include performic acid, peracetic acid, perbenzoic acid and pertrifluoroacetic acid. Examples of the hydroperoxide include hydrogen peroxide, tert-butyl peroxide and cumene peroxide. The epoxidation reaction can be carried out using a catalyst if required. Examples of the catalyst include inorganic bases such as sodium carbonate and potassium carbonate; inorganic acids such as sulfuric acid and hydrochloric acid; molybdenum carbonyls such as molybdenum hexacarbonyl; and a mixture of tungstic acid and an inorganic base such as sodium hydroxide.

The presence or absence of the solvent in the epoxidation reaction and the reaction temperature can be properly adjusted depending on devices used and properties of starting materials. At that time, the unreacted vinyl group (—CH=CH₂) and/or the formed epoxy group

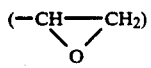

causes the side reaction with the oxidizing agent under the conditions of the epoxidizing conditions simultaneously with the epoxidation of the vinyl group in the starting copolymer, with the result that the modified substituent is formed and contained in the curing resin (B).

The ratio at which to contain the modified substituent is determined depending on the type of the oxidizing agent, the molar ratio of the oxidizing agent and the vinyl group, the reaction conditions, etc. When the oxidizing agent is peracetic acid, the modified substituent is principally a substituent represented by the following formula (IX).

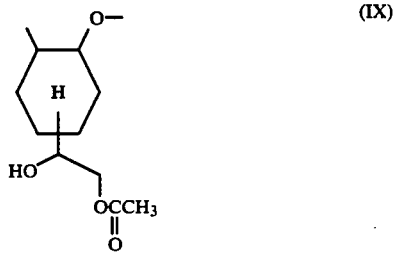

In the reaction between vinylcyclohexene-1-oxide of formula (VII) and the epoxidized product of the alpha-olefin of formula (VIII), it is also possible to conduct the ring-opening copolymerization by the conjoint use of epoxy compounds other than the aforesaid ones. The other copolymerizable epoxy compounds are not limited and can be any types if having the epoxy group. Examples thereof are oxides of unsaturated compounds such as ethylene oxide, propylene oxide, butyrene oxide and styrene oxide; glycidyl ether compounds such as allylglycidyl ether, 2-ethylhexylglycidyl ether, methylglycidyl ether, butylglycidyl ether, and phenylglycidyl ether; glycidyl ester compounds of unsaturated organic carboxylic acids such as acrylic acid and methacrylic acid; and alicyclyc oxysilane group-containing vinyl monomers such as 3,4-epoxycyclohexylmethyl (meth)acrylate.

The amount of the curing resin (B) can properly be changed depending on the type of the substrate resin (A) used and within the range from the minimum amount necessary to heat-cure the resulting coated film to the maximum amount that does not impair stability of the cationic electrodeposition coating. It is advisable to select the amount of the curing resin (B) such that the curing resin (B)/substrate resin (A) weight ratio (solids content) is usually 0.2/1 to 1/1, preferably 0.25/1 to 0.85/1, more preferably 0.25/1 to 0.65/1.

In the composition of this invention, a substance obtained by previously adding part of the curing resin (B) to the substrate resin (A) may be contained.

The resin composition of this invention comprising the substrate resin (A) and the curing resin (B) can be used as a cationic electrodeposition coating resin.

The cationic electrodeposition coating resin composition is prepared using the resin composition of this invention by, for example, mixing the substrate resin (A) with the curing resin (B), then dispersing stably the mixture in an aqueous medium, and adding additives if required. Examples of the additives are color pigments such as carbon black, titanium white, white lead, lead oxide and red oxide; extender pigments such as clay and talc; and anticorrosive pigments such as strontium chromate, lead chromate, basic lead chromate, red lead oxide, lead silicate, basic lead silicate, lead phosphate, basic lead phosphate, lead tripolyphosphate, lead silicochromate, chrome yellow, lead cyanamide, calcium plumbate, lead suboxide, lead sulfate, and basic lead sulfate. Other additives are also available. They are, for example, a dispersant, a nonionic surface active agent (small amount) as a cissing inhibitor of a coated surface, and a curing accelerator.

Especially, to thoroughly cure the electrodeposition coated film formed by using the composition of this invention at a relatively low temperature of 160° C. or below, it is effective to add to the composition of this invention one or more of metallic compounds, as a catalyst, selected from a lead compound, a zirconium compound, a cobalt compound, an aluminum compound, a manganese compound, a copper compound, a zinc compound, an iron compound, a chromium compound and a nickel compound. Concrete examples of these metallic compounds are chelate compounds such as zirconium acetylacetate, cobalt acetylacetonate, aluminum acetylacetonate and manganese acetylacetonate; a chelated reaction product of a compound having a beta-hydroxyamino structure and lead (II) oxide; and carboxylates such as lead 2-ethylhexanoate, lead oenanthate, lead naphthenate, lead octanate, lead benzoate, lead ace tate, lead lactate, lead formate, lead glycolate and octanate zirconium.

The content of the metal in the metallic compound is usually not more than 10% by weight, preferably not more than 5% by weight, desirously not less than 0.2% by weight, based on the total weight (solids content) of the substrate resin (A) and the curing resin (B).

The thickness of the coated film obtained by electro-depositing the thus prepared cationic electrodeposition coating resin composition on a suitable substrate is not strictly limited. It is however usually 3 to 200 micrometers based on the cured coated film. The coated film can be heat-cured at a temperature of 70° C. to 250° C., preferably 120° C. to 160° C.

A method of forming an electrodeposition coated film on a substrate using the cationic electrodeposition coating resin composition of this invention is not limited in particular, and can be performed under usual cationic electrodeposition coating conditions. For instance, the substrate resin (A) and the curing epoxy resin (B) according to this invention are dispersed in water as noted above, and the dispersion is blended with the pigment, the curing catalyst and the other additives and a cationic electrodeposition bath having a bath concentration (solids content) of 5 to 40% by weight, preferably 10 to 25% by weight and a bath pH of 5 to 8, preferably 5.5 to 7 is then prepared. Subsequently, in this electrodeposition bath, electrodeposition is carried out under the following conditions by using, for example, a carbon plate of 5 cm×15 cm×1 cm as an anode and a zinc phosphate treated plate of 5 cm×15 cm×0.7 mm as a cathode.

Bath temperature: 20° to 35° C., preferably 25° to 30° C.

DIRECT CURRENT

Current density: 0.005 to 2A/cm², preferably 0.01 to 1 A/cm²

Voltage: 10 to 500 V, preferably 100 to 300 V

Time of passing an electric current: 0.5 to 5 minutes, preferably 2 to 3 minutes After the electrodeposition coating, the coated product is withdrawn from the electrodeposition bath and washed with water, and the moisture of the electrodeposition coated film is removed by a drying means such as a hot air.

Thus, the electrodeposition coated film formed from the cationic electrodeposition coating resin composition of this invention can be heat-cured in the aforesaid manner.

The following Preparation Examples, Examples and Comparative Example illustrate this invention more specifically. In these examples, "parts" and "%" are all by weight.

PREPARATION EXAMPLE OF A SUBSTRATE RESIN (A-1)

Monoethanolamine (39 parts) was maintained at 60° C. in a reaction vessel, and 100 parts of N,N-dimethylaminopropylacrylamide was added dropwise. The reaction was run at 60° C. for 5 hours to obtain a monoethanolamine adduct of N,N-dimethylaminopropylacrylamide.

Separately, 950 parts of bisphenol A diglycidyl ether having an epoxy equivalent of 190, 340 parts of Glycidol BPP-350 (a tradename for an epoxy resin of Sanyo Kasei K.K.) having an epoxy equivalent of 340, 456 parts of bisphenol and 21 parts of diethanolamine were charged, and the temperature was raised to 120° C. The reaction was conducted until the epoxy value reached 1.02 mmols/g to afford a partial amine adduct of a polyepoxide compound having a number-average molecular weight of 1,740 and an epoxy equivalent of 870. Subsequently, 1,767 parts of the resulting partial amine adduct was diluted with 479 parts of ethylene glycol monobutyl ether and cooled. While keeping the temperature at 100° C., 158 parts of diethanolamine and 43 parts of the monoethanolamine adduct of N,N-dimethylaminopropylacrylamide, and the reaction was conducted until the increase in viscosity stopped. There was obtained a substrate resin (A-1) having a resin solids content of 80%, a primary hydroxyl equivalent of 526 and an amine value of 54.

PREPARATION EXAMPLE OF A SUBSTRATE RESIN (A-2)

Bisphenol A diglycidyl ether (950 parts) having an epoxy equivalent of 190, 330 parts of an epoxy resin XB-4122 (a tradename for a product of Ciba Geigy) having an epoxy equivalent of 330, 456 parts of bisphenol A and 21 parts of diethanolamine were charged. The temperature was elevated to 120° C., and the reaction was run until the epoxy value reached 1.02 mmols/g to obtain a partial amine adduct of a polyepoxide compound having a number-average molecular weight of 1,740 and an epoxy equivalent of 870. Subsequently, 1,757 parts of the resulting partial amine adduct was diluted with 489 parts of ethylene glycol isopropyl ether and cooled. While keeping the temperature at 90° C., 126 parts of diethanolamine, 53.5 parts of the monoethanolamine adduct of N,N-dimethylaminopropylacrylamide and 18.5 parts of N-methylaminoethanol were added, and the reaction was performed until the increase in viscosity stopped. There resulted a substrate resin (A-2) having a resin solids content of 80%, a primary hydroxyl equivalent of 588 and an amine value of 55.

PREPARATION EXAMPLE OF A CURING RESIN (B-1)

Two hundred parts of a 10% ethyl acetate solution of BF₃-etherate was added to 182 parts of 4-vinylcyclohexene-1-oxide, 41 parts of AOEX 24 (a tradename for a product of Daisel Kagaku Kogyo K.K.:

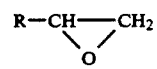

wherein R denotes an alkyl group with 12 to 14 carbon atoms, a number-average molecular weight of 196), and 5.8 parts of allyl alcohol at 50° C. over a period of 4 hours to conduct ring-opening polymerization. Ethyl acetate was added and the mixture was washed with water. The ethyl acetate layer was concentrated and dissolved in 130 parts of fresh ethyl acetate. Peracetic acid (160 parts) was added dropwise as an ethyl acetate solution at 50° C. for 4 hours, the mixture was aged at 50° C. for 2 hours and the epoxidation reaction was carried out. After acetic acid, ethyl acetate and peracetic acid were removed, the residue was dissolved in 500 parts of ethyl acetate at 40° C. Successively, the solution was washed four times with 250 parts of distilled water. Ethyl acetate was then removed, and the residue was dissolved in 57 parts of propylene glycol monoethyl ether at 80° C. to afford a curing resin (B-1) having a solids content of 80% and an epoxy equivalent of 201 and containing 18% (solids content) of the epoxy compound of the alpha-olefin. Said resin had a weight-average molecular weight of about 1,400.

PREPARATION EXAMPLE OF A CURING RESIN (B-2)

Two hundred parts of a 10% ethyl acetate solution of BF₃-etherate was added dropwise to 182 parts of 4-vinylcyclohexene-1-oxide, 17 parts of AOEX 68 (a tradename for a product of Daisel Kagaku Kogyo K.K.:

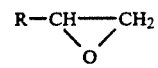

wherein R denotes an alkyl group with 16 to 18 carbon atoms, a number-average molecular weight of 252) and 5.8 parts of allyl alcohol at 50° C. over a period of 4 hours to conduct ring-opening polymerization. The subsequent procedure was conducted as in the curing resin (B-1), and the resulting product was then dissolved in 51 parts of methyl isobutyl ketone 80° C. to provide a curing resin (B-2) having a solids content of 80% and an epoxy equivalent of 195, and containing 8% (solids content) of the epoxidized product of the alpha-olefin. Said resin had a weight-average molecular weight of about 1,200.

PREPARATION EXAMPLE OF A CURING RESIN (B-3)

Two hundred parts of a 10% ethyl acetate solution of BF₃-etherate was added dropwise to 182 parts of 4- vinylcyclohexene-1-oxide, 25 parts of AOEYO 8 (a tradename for a product of Daisel Kagaku Kogyo K.K.:

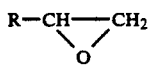

wherein R denotes an alkyl group with 20 to 30 carbon atoms, a number-average molecular weight of 342) and 13.5 parts of trimethylolpropane at 50° C. over a period of 4 hours to conduct ring-opening polymerization. The subsequent procedure was conducted as in the curing resin (B-1). The resulting product was then dissolved in 55.1 parts of methyl isobutyl ketone at 80° C. to afford a curing resin (B-3) having a solids content of 80% and an epoxy equivalent of 198, and containing 11% (solids content) of the epoxidized product of the alpha-olefin. Said resin had a weight-average molecular weight of about 1,500.

PREPARATION EXAMPLE OF A PIGMENT PASTE (P-1)

Said substrate resin and 4.4 parts of 10% formic acid were added, and with stirring, 15 parts of deionized water was added. Further, 10 parts of titanium white, 10 parts of clay, 1 part of carbon and 2 parts of basic lead silicate were added. After they were dispersed with a ball mill for 24 hours, 12 parts of deionized water was added to obtain a paste having a solids content of 50%.

PREPARATION EXAMPLE OF A PIGMENT PASTE (P-2)

A paste having a solids content of 50% was formed as in Preparation Example of the pigment paste (P-1) except that 3 parts of dioctyltin oxide was added as a dissociation catalyst for blocked isocyanate and the amount of deionized water was changed from 12 parts to 18.3 parts.

EXAMPLE 1

Eighty eight parts of the substrate resin solution (A-1), 38 parts of the curing resin solution (B-1), 16 parts of 10% formic acid, 3 parts of lead octanate and 355 parts of deionized water were blended to obtain an aqueous emulsion. Subsequently, 450 parts (a solids content 20%) was blended with 66 parts of the pigment paste (P-1), and deionized water was added to a solids content of 20% to obtain a coating composition. Thereafter, using the coating composition as an electrodeposition bath, a product (untreated steel plate) being coated was subjected to cationic electrodeposition coating (at 150 to 250 V for 3 minutes) at a bath temperature of 30° C. such that a dry film thickness reached about 20 micrometers, followed by baking at 140° C. for 30 minutes.

EXAMPLES 2 to 4

Coating compositions were obtained as in Example 1 according to the formulation shown in Table 1. Subsequently, coating and baking were carried out as in Example 1.

COMPARATIVE EXAMPLE

Eighty eight parts of the substrate resin solution (A-1) was blended with 50 parts of B-1370 (a tradename for an oxime blocked product of isophorone-type polyisocyanate made by Daisel Hüls K.K.; a solids content 60%; (C-1)), 16 parts of 10% formic acid, lead octanate and 343 parts of deionized water to obtain an aqueous emulsion. Subsequently, 450 parts of the aqueous emultion (20%) and 66 parts of the pigment paste (P-2) were blended, and the resulting product was diluted to a solids content of 20% with deionized water. Using the resulting product as an electrodeposition bath, coating and baking were carried out as in Example 1.

Properties of the baked coated film were tested and the results are shown in Table 1.

TABLE 1

| | | | Example 1 | Example 2 | Example 3 | Example 4 | Comparative Example |
|---|---|---|---|---|---|---|---|
| Formulation | Aqueous emulsion | Substrate resin | | | | | |
| | | type | A-1 | A-2 | A-1 | A-1 | A-1 |
| | | amount | 88 | 88 | 88 | 88 | 88 |
| | | Curing resin | | | | | |
| | | type | B-1 | B-1 | B-2 | B-3 | C-1 |
| | | amount | 38 | 38 | 38 | 38 | 50 |
| | | 10% Formic acid | 16 | 16 | 16 | 16 | 16 |
| | | Lead octanate | 3 | 3 | 3 | 3 | 3 |
| | | Deionized water | 355 | 355 | 355 | 355 | 343 |
| | Electro-deposition bath | Aqueous emulsion (20%) | 450 | 450 | 450 | 450 | 450 |
| | | Pigment paste | | | | | |
| | | type | P-1 | P-1 | P-1 | P-1 | P-2 |
| | | amount | 66 | 66 | 66 | 66 | 66 |
| Properties of a coated film | | Impact strength | 50< | 50< | 50< | 50< | 50< |
| | | Salt spray resistance | 450 | 450 | 500 | 430 | 240 |
| | | Salt water resistance | 500 | 500 | 480 | 456 | 200 |

Test Methods

Impact strength: JIS K5400 6.13B method (impact deformation test). A weight - 500 g. There was measured a height (cm) of a weight that does not cause break and delamination of the coated film.

Salt spray resistance: JIS Z2371. Crosscut was applied to the coated film. There was measured a time that lapsed until a blister of a piece with a width of 3.0 mm delaminated from the crosscut or a blister of a partially coated film except the crosscut reached 8F (ASTM D714-56).

Salt water resistance: The coated film was dipped in a 5% sodium chloride aqueous solution of 50° C. After the test, the dipped film was dried at room temperature for 2 hours. Subsequently, a cellophane tape was strongly pressed to the coated film, and then abruptly peeled off from the coated film. There was measured a dipping time that lapsed until the area of the coated film reached 90% of the original area.

What we claim is:

1. A cationic electrodeposition coating method which comprises subjecting a substrate to cationic electrodeposition coating employing an electrodeposition bath containing a cationic electrodeposition coating resin coating composition composed mainly of (A) a resin containing a primary hydroxyl group and a cationic group, and (B) an epoxy resin which is a copolymer comprising recurring units represented by formula (I)

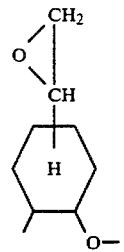

and recurring units represented by formula (II)

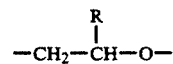

wherein R denotes a $C_3$–$C_{35}$ alkyl group, the proportion of the recurring units of formula (II) being 1 to 75% by weight.

* * * * *

UNITED STATES PATENT AND TRADEMARK OFFICE
CERTIFICATE OF CORRECTION

PATENT NO. : 5,139,631

DATED : August 18, 1992

INVENTOR(S) : REIZIRO NISHIDA and AKIRA TOMINAGA

It is certified that error appears in the above-identified patent and that said Letters Patent is hereby corrected as shown below:

On the cover page of the patent, under section [19], change

"Mishida" to —Nishida—;

under section [75], change

"Reiziro Mishida" to read —Reiziro Nishida—.

Signed and Sealed this

Twenty-sixth Day of October, 1993

Attest:

BRUCE LEHMAN

*Attesting Officer*  *Commissioner of Patents and Trademarks*